Aug. 30, 1960   W. F. HERLIHY   2,950,545
SHOE WHEREIN THE LASTING MARGIN OF THE UPPER IS LASTED IN
REARWARDLY OF THE HEEL BREAST LINE, AND TURNED OUTWARDLY
FORWARDLY OF SAID LINE AND WHICH HAS AN INSOLE WHICH IS
CONNECTED TO OTHER PARTS OF THE SHOE ONLY
BY THE UPPER LINING

Filed Aug. 15, 1956   2 Sheets-Sheet 1

Fig. 10ᵃ

Inventor
William F. Herlihy
by Roberts, Cushman & Grover
Att'ys

Aug. 30, 1960 W. F. HERLIHY 2,950,545
SHOE WHEREIN THE LASTING MARGIN OF THE UPPER IS LASTED IN
REARWARDLY OF THE HEEL BREAST LINE, AND TURNED OUTWARDLY
FORWARDLY OF SAID LINE AND WHICH HAS AN INSOLE WHICH IS
CONNECTED TO OTHER PARTS OF THE SHOE ONLY
BY THE UPPER LINING
Filed Aug. 15, 1956 2 Sheets-Sheet 2
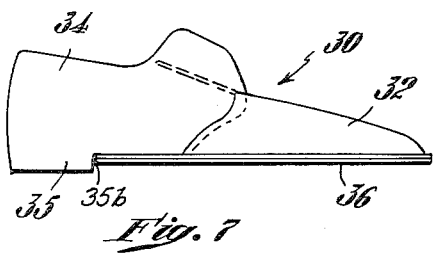
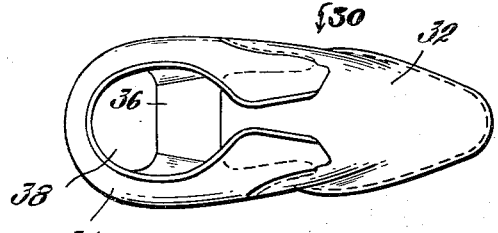
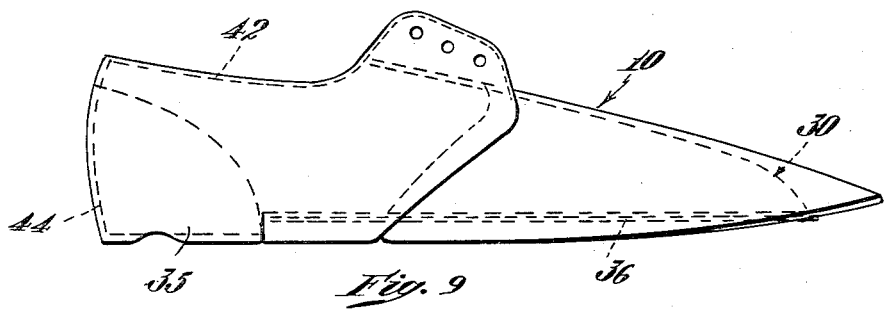
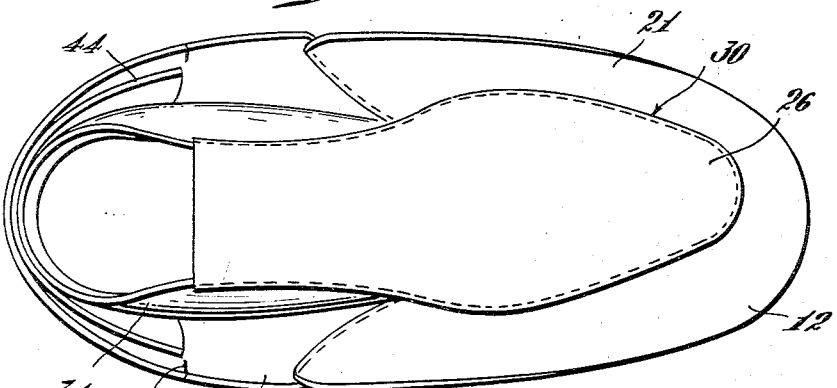
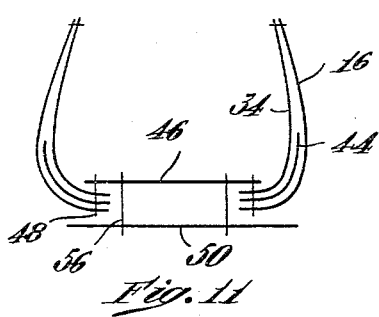
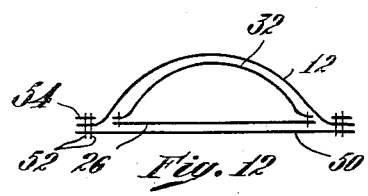
Inventor
William F. Herlihy
by Roberts, Cushman & Grover
Att'ys

United States Patent Office 2,950,545
Patented Aug. 30, 1960

2,950,545

SHOE WHEREIN THE LASTING MARGIN OF THE UPPER IS LASTED IN REARWARDLY OF THE HEEL BREAST LINE, AND TURNED OUTWARDLY FORWARDLY OF SAID LINE AND WHICH HAS AN INSOLE WHICH IS CONNECTED TO OTHER PARTS OF THE SHOE ONLY BY THE UPPER LINING

William F. Herlihy, Haverhill, Mass., assignor to Lowell Counter Company, Lowell, Mass., a copartnership Filed Aug. 15, 1956, Ser. No. 604,172

2 Claims. (Cl. 36—16)

This invention relates to shoes and a method of making the same and has special application to the so-called "slip lasted" shoe.

An object of the invention is to provide a shoe of the foregoing kind having a higher degree of flexibility at the forepart than conventional stitch-down and California type shoes. Another object is to provide a shoe which has great flexibility throughout the forepart without sacrifice in firmness and shape retaining characteristics at the heel end. Other objects are to provide a shoe of the foregoing kind which has improved appearance and wearing qualities. A still further object is to provide a method of making a shoe embodying the foregoing characteristics in sub-assemblies which expedite manufacture, require less skill and afford manufacturing economies.

As herein illustrated, the shoe has an upper and sole within which there is a sock comprised of an upper element including a vamp and quarter portions, and a bottom element which terminate rearwardly approximately at the heel breast line, the upper element of the sock being attached at its upper edge to the upper, and the bottom element of the sock being attached exclusively to the lower edge of the upper element of the sock. The unjoined quarter portions of the upper element of the sock and the upper (prior to lasting) form an open heel pocket accessible from the bottom opening prior to attachment of the outsole, and a counter is situated in this pocket. The forepart of the upper is turned outwardly and secured to the sole after the manner of a stitch-down shoe while the quarter portions of the upper and sock with the lower edge of the counter sandwiched therebetween are lasted inwardly over a tuck or heel piece situated rearwardly of the bottom element of the sock and attached thereto, and the latter in turn is attached to the sole.

In accordance with the method of manufacture, a vamp and quarter are united to form a closed upper with a throat or foot-receiving opening at the top and having a lasting margin at its bottom, preparing a sock comprised of an upper element corresponding to the upper and a bottom element without a heel end, the margin of which is stitched to the upper element of the sock at the forepart and thereupon assembling the parts by joining the upper edge of the sock to the corresponding upper edge of the upper, so that the sock hangs within the upper. A counter member is inserted between the quarters of the upper and sock at the heel end and the layers are subjected to molding pressure to impart the desired final shape to the heel. A last is slipped into the sock, a heel or tuck piece is placed over the heel seat opening rearwardly of the bottom element of the sock and then the lasting margin of the upper, sock and the margin of the counter are lasted inwardly over the heel piece and attached thereto. The sole is then laid over the bottom element of the sock and the lasting margin of the vamp is turned outwardly and attached thereto by stitching or the like. If desired a welt strip may be stitched to the sole together with the out-turned lasting margin. The last is then removed and the heel piece attached to the sole at the heel end thus completing the shoe.

The invention will now be described in greater detail with reference to the accompanying drawings wherein:

Fig. 7 is an elevation of the upper element and bottom element of the sock assembled and stitched together;

Fig. 8 is a plan view of Fig. 7;

Fig. 9 is an elevation of the upper assembly with the sock assembly stitched therein;

Fig. 10 is a bottom view of the assembled upper and sock;

Fig. 10a is a plan view of the heel piece;

Fig. 11 is a diagrammatic cross section at the heel end of the completed shoe; and Fig. 12 is a diagrammatic cross section at the toe of the completed shoe.

Figure 1:
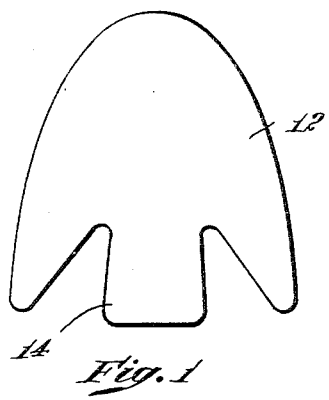
Fig. 1 is a plan view of the vamp of the upper.
Figure 3:
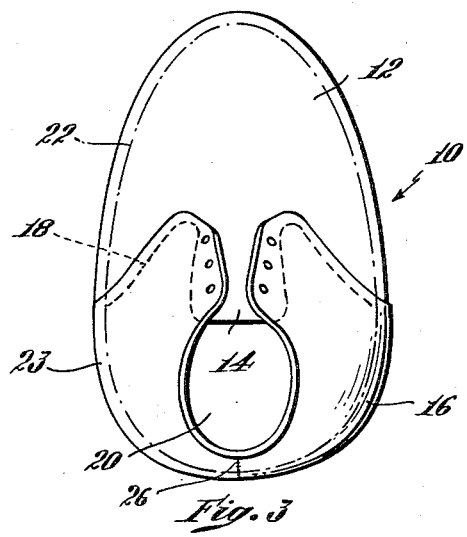
Fig. 3 is a plan view of the vamp and quarters assembled and stitched together.
Figure 2:
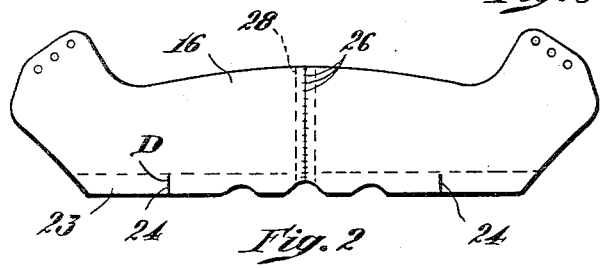
Fig. 2 is a plan view of the quarters of the upper.

Referring to the drawings, there is shown in Figs. 1 to 3 inclusive, an upper 10 which is comprised of a vamp 12 including a tongue 14 and quarters 16 joined at their forward ends to the rear ends of the vamp by stitching 18 in conventional fashion. As thus closed or circularly joined the upper has a throat opening 20 and a bottom opening 21.

The vamp and quarters are cut large so as to provide an ample lasting margin 22 and 23 (Figs. 2 and 3) and the margins of the quarters at opposite sides at about the breast line of the heel are notched or slit at 24 (Figs. 9 and 10). The quarters, as shown, are joined, in closing the upper, by back seam stitching 26 and preferably a strip of tape 28 is applied over the stitching to reinforce and cover the seam ridge.

Figure 4:
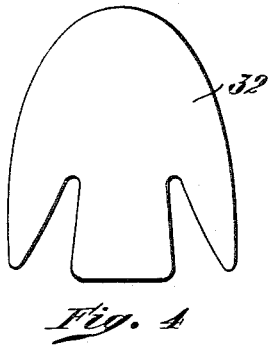
Fig. 4 is a plan view of the vamp of the sock.
Figure 6:
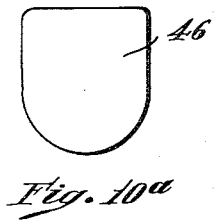
Fig. 6 is a plan view of the bottom element of the sock.
Figure 6:
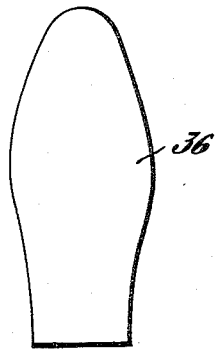
Figure 5:
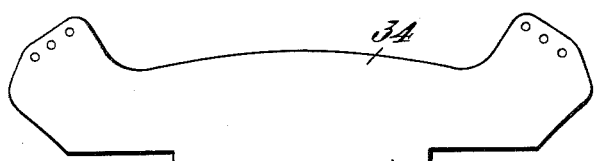
Fig. 5 is a plan view of the quarters of the sock.

Instead of lining the upper in the conventional manner, a sock 30 (Figs. 4 to 8) is made up independently of the upper assembly. The sock is comprised of an upper element 31 which includes a vamp portion 32 and a unitary quarter portion 34 (Figs. 4 and 5), joined together in the same fashion as the upper, and a bottom element 36 (Fig. 6) which has no heel end, stitched at its margin to the lower edge of the vamp and quarter portions of the upper element, as shown in Figs. 7 and 8. The back part of the quarter lining has an extension 35 which is substantially coextensive with the lasting margin of the upper quarters. The lower edge 35a of the forepart of the upper element which is separated from the extension 35 by slits 35b is turned out and stitched to the upper surface of the peripheral edge of the bottom element 36. Any excess of the upper element of the forepart after stitching to the bottom element is trimmed off while the extension 35 around the heel end is left intact. The sock thus prepared has a top or throat opening 38, is closed at the forepart of the bottom, is open at the heel part and has a lasting margin around the heel end constituted by the extension 35. The sock may be made of soft leather or fabric suitable for contact with the foot.

The sock 30 is now placed within the upper 10, as shown in Fig. 9, and its upper edge at the throat opening is joined to the upper edge of the upper at its throat opening by means of a line of stitching 42 so that the sock 30 hangs freely within the upper 10, and is joined thereto only along the throat opening, the outer surface of the upper element, below its upper edge, being unattached to the inner surface of the upper. Since the lower portions of the sock at the heel end and upper are unjoined a counter stiffener element 44 may be inserted between the quarters, as shown in bottom view in Fig. 10. The assembly as thus prepared is placed in a mold, such as shown in my United States Patent No. 2,424,888, and subjected to die molding pressure to unite the quarters with the counter and to impart a permanent shape of the desired contour thereto. The molding preferably includes partially bending the lasting margins of the upper, sock at the heel end and the included edge of the counter inwardly to form a heel attaching flange. The counter is preferably comprised of a material which will take and retain a predetermined shape by an application of molding pressure and has inherent adhesive properties so as to cause the upper and heel end of the sock to adhere to its opposite sides under pressure thus to provide a united rigid heel end.

After thus molding the heel end a last is slipped into the sock and a tuck or heel piece 46 is placed in the heel seat area rearwardly of the bottom element 36 (Fig. 11) whereupon the lasting margins of the upper and upper element of the sock are lasted inwardly at the rear part together with the counter, and pressed against the tuck or heel piece and attached thereto by suitable fastening means, such as tacks or staples 48 (Fig. 11). A sole 50 is then laid over the bottom element 36 and heel piece, and the lasting margin 22, 23 of the upper, as far back as the heel seat, is turned outwardly (Fig. 12) and attached to the sole by suitable means, for example stitching 52 without binding the forepart of the sock to the sole 50 or any part thereof directly or indirectly in the manner of a stitch-down shoe. If desired, a flat welt strip 54 may be superposed on the outturned margin of the upper and stitched together with the margin to the sole 50 so as to give a more finished appearance. The last is then removed and fastening means 56, for example staples, are then driven through the heel piece 46 into the sole 50 thus completing the construction.

As thus constructed the shoe has at its forepart an outturned upper of conventional stitch-down construction and a complete sock 30 suspended in the upper, the upper element of the sock being unattached to the upper 10 except along its throat opening to the corresponding throat opening of the upper and the bottom element 36 resting upon the inner side of the sole 50 but being unattached thereto. A very flexible, light weight, comfortable bottom structure is thus afforded at the forepart of the shoe. The heel part nevertheless is of conventional lasted-in formation and provides the strength, rigidity and shape-retaining characteristics desired. The shoe thus has the external appearance at the forepart of a stitch-down shoe without the inherent stiffness of that type of shoe which usually includes an insole, a comparatively stiff midsole and an outsole.

It should be understood that the present disclosure is for the purpose of illustration only and that this invention includes all modifications and equivalents which fall within the scope of the appended claims.

I claim:

1. A shoe having an upper and sole, a sock disposed within the upper, said sock comprising an upper element and a bottom element, the latter terminating at the heel breast line, means uniting the upper margin of the upper element of the sock to the upper at the throat opening, and means uniting the lower margin of the upper element of the sock to the bottom element, forwardly of the heel breast line, which the outer surface of the upper element of the sock unattached to the inner surface of the upper and with the lower surface of the bottom element of the sock resting on, but unattached to the sole, said sock being loose within the shoe and freely movable therein relative to the inside of the shoe.

2. A shoe comprising an upper, a sock disposed within the upper, said sock comprising an upper element including a vamp and quarters and a soft flexible bottom member terminating at the heel breast line, a tuck piece situated within the heel seat area rearwardly of the bottom member and a sole subjacent the bottom element and tuck piece, the lower margin of the upper and the upper element of the sock containing slits at the heel breast line dividing the margin forwardly of the heel breast from that rearwardly thereof, means attaching the lower margin of the upper element of the sock to the bottom element from the tip of the toe rearwardly to the heel breast line, the upper and upper element of the sock rearwardly of the slits being lasted in over the tuck piece and united thereto, and the margin of the upper forwardly of the slits being turned out and united to the margin of the sole, means uniting the rear end of the sole to the tuck piece, and means uniting the upper margin of the upper element of the sock to the upper at the throat opening, the outer surface of the upper element of the sock and the under surface of the bottom element being contiguous to the inner surface of the upper and the upper surface of the sole but unattached thereto.

References Cited in the file of this patent

UNITED STATES PATENTS

| | | |
|---|---|---|
| 503,062 | Norwood | Aug. 8, 1893 |
| 788,354 | Engel | Apr. 25, 1905 |
| 802,075 | Engel | Oct. 17, 1905 |
| 1,075,806 | Austin | Oct. 14, 1913 |
| 1,687,529 | Valentine | Oct. 16, 1928 |
| 1,754,225 | Eatoner | Apr. 15, 1930 |
| 1,784,806 | Fried | Dec. 9, 1930 |
| 1,952,587 | De Stefan | Mar. 27, 1934 |
| 2,111,705 | Tobacco | Mar. 22, 1938 |
| 2,359,896 | Chandler | Oct. 10, 1944 |
| 2,379,681 | Cohen | July 3, 1945 |
| 2,392,816 | Gleason | Jan. 15, 1946 |
| 2,393,989 | Kamborian | Feb. 5, 1946 |
| 2,404,586 | Maling | July 23, 1946 |
| 2,443,588 | Ayers | June 22, 1948 |
| 2,446,286 | Kamborian | Aug. 3, 1948 |
| 2,495,590 | Meltzer | Jan. 24, 1950 |
| 2,554,159 | Stritter | May 22, 1951 |

FOREIGN PATENTS

| | | |
|---|---|---|
| 822,947 | Germany | Nov. 29, 1951 |
| 1,085,774 | France | Aug. 4, 1954 |